(12) United States Patent
Naquin et al.

(10) Patent No.: US 8,474,105 B2
(45) Date of Patent: Jul. 2, 2013

(54) DETACHABLE SYNTHETIC ROPE CONNECTOR

(76) Inventors: Andrew Naquin, Cut Off, LA (US);
Richard D. Halin, Richmond, TX (US);
Richard E. Hall, Covington, LA (US);
Peter L. Kazunas, Mandeville, LA (US)

( * ) Notice: Subject to any disclaimer, the term of this patent is extended or adjusted under 35 U.S.C. 154(b) by 317 days.

(21) Appl. No.: 12/799,958

(22) Filed: May 5, 2010

(65) Prior Publication Data
US 2010/0281656 A1 Nov. 11, 2010

Related U.S. Application Data

(60) Provisional application No. 61/215,418, filed on May 5, 2009.

(51) Int. Cl.
*F16G 11/00* (2006.01)
(52) U.S. Cl.
USPC ........................................ 24/115 R; 403/210
(58) Field of Classification Search
USPC ............. 24/115 R, 265 AL, 115 K; 294/81.2, 294/74, 215; 114/230.1, 230.2, 230.26; 212/307; 254/210, 245, 391, 409; 410/101, 410/102, 116; 403/210
See application file for complete search history.

(56) References Cited

U.S. PATENT DOCUMENTS

| | | | |
|---|---|---|---|
| 3,867,046 A * | 2/1975 | Fox | 403/210 |
| 3,962,811 A * | 6/1976 | Buschini et al. | 43/8 |
| 4,074,519 A * | 2/1978 | Garrett | 59/95 |
| 4,139,179 A * | 2/1979 | Kukulski | 254/391 |
| 4,164,378 A | 8/1979 | Linehan | |
| 4,509,448 A | 4/1985 | Pease et al. | |
| 4,513,681 A | 4/1985 | Crook, Jr. | |
| 4,592,686 A * | 6/1986 | Andrews | 410/101 |
| 4,993,769 A * | 2/1991 | Chapalain | 294/74 |
| 6,068,310 A | 5/2000 | Fuller | |
| 6,092,484 A | 7/2000 | Babin et al. | |
| 7,516,713 B1 | 4/2009 | Franta | |

* cited by examiner

*Primary Examiner* — Robert J Sandy
*Assistant Examiner* — Rowland D Do
(74) *Attorney, Agent, or Firm* — Juan J. Lizarraga

(57) ABSTRACT

A detachable synthetic rope connector with connector body, bale, main load pin sub assembly, and a restraining load sub assembly that permits the use of large diameter synthetic and other mooring components such as cable and chain on offshore work vessels without specialized deck equipment. The inventive connector allows for safe and redundant restraint of a mooring segment in order to provide transfer of the tension load while providing connection features that simplify separation and the reduction of safety risks to vessel working personnel and the environment, and the features allow for the connector to be separated easily while the portion holding the rope is restrained while the bale can be removed.

2 Claims, 11 Drawing Sheets

DETACHABLE SYNTHETIC ROPE CONNECTOR

This application claims priority from U.S. Provisional application Ser. No. 61/215,418 (the '418 application') filed May 5, 2009. The '418 application is incorporated here by reference.

BACKGROUND OF THE INVENTION

Offshore deepwater mooring systems frequently employ mooring segments that are synthetic. The synthetic mooring segments have length limitations requiring that multiple segments be used in deep locations. Processes of installation, moving, inspection and modifications to the mooring systems require that the segments be lifted onto an offshore work vessel and be restrained to perform the required operations.

The lifting of mooring segments along with supporting anchors and seabed chain lengths above the seabed, develop significant tension due to the gravity loads. These tension levels can exceed 20 tons.

Mooring segments must be separated when a winch drum or storage reel is full or when it is necessary to change or replace a connector in the mooring segment. Prior to separating the mooring segment, it is further necessary to release the tension on the connection to be separated by restraining the subsea side of the mooring segment and transferring the tension from the segment to be separated.

When large diameter synthetic mooring lines are being used, the work vessels may not have sufficiently large deck equipment to restrain the system and allow the connection to be separated. The existing deck mounted restraint equipment is generally not large enough for the larger synthetic ropes proposed for use by the industry.

SUMMARY OF THE INVENTION

The unique features of the inventive detachable synthetic rope connector allow commonly available shackles and cables to be used with pad-eyes mounted on the deck of a work vessel to handle large synthetic and other mooring components that exceed the capacity of the installed vessel deck restraint equipment. These features also increase the safety of the offshore work by providing redundancy when servicing the mooring systems. The use, function and configuration of these features for the mooring connector are embodied by the present invention.

The present invention comprises an optimized bale that is detachable from a connector body. The disconnection of the bale from the connector body allows a single connector to be separated while restraining rope under tension. The bale cross section is optimized in a manner wherein the cross section of the apex differs from the cross section of the bottom portions. Further the geometric centerline of the bale differs from a pure radius to allow optimization of the shear, bending and tension components of the stresses induced by the loading at the apex. The variation of the cross section is such that each portion is optimized for stress while minimizing weight and further allowing the passage of the bale through intended existing connecting links and chain ends. The optimization is performed to require the unique feature, in certain limits of load rating, the rotation of the bale through an intended connecting link as a means of further minimizing weight and stress for increased safety.

Other features that are desirable and embodied in the invention is the ability to reel the connector directly onto a storage reel without damaging synthetic rope. These features include external radii on all surfaces that are sufficiently large to prevent high local contact loads on the synthetic or other rope compositions. These radii are at least ½ inch in radius but may be as large as 6 inches to prevent excessive contact forces and damaging contact stresses on contacted rope on storage reels.

While the use of this invention is particularly useful for large diameter synthetic rope connectors it is equally beneficial for wire rope and chain installations.

It is an object of this invention to provide a detachable connector for rope, having a connector body with a left side and a right side configured to receive a rope wrapped around said connector body, an optimized bale with an apex, a right side and a left side and a bottom right side end and a bottom left side end mounted on and detachable from said connector body, a main load pin subassembly extending from the right side to the left side of both the connector body and bale, and a restraining load subassembly extending from the right side to the left side of the connector body.

It is a further object that the connector body comprises a cavity extending from the right side to the left side of the connector body to receive the main load pin subassembly, a hole extending from the right side to the left side of the connector body to receive the restraining load subassembly, and a recess on the right and left side of the connector body to respectively receive and constrain the bottom right side end and bottom left side end of the bale, and the bale further comprises a hole extending from the right side to the left side to receive the main load pin subassembly, said hole having a recess at the right side and left side.

It is a further object that the main load pin subassembly has a main load pin with a right end and a left end, each of the ends having threaded holes, a shoulder on one of the ends configured to seat in the right or left side recess of the bale, a circular end plate on the other of the ends, configured to seat in one of the recesses of the bale and being fixed to the pin with fasteners, and the restraining load sub assembly has a main restraining pin having a right end and a left end, each of the ends fitted with padeye caps and retaining pins. Alternative to a shoulder on one end, both ends of the pin may be configured to accept circular plates each being fixed to the pin with fasteners. The radius of said fasteners being such that the plates are fixed to the pin and not to the connector body preventing torque due to relative motion of the pin with the connector body from generating high torsional loads on fasteners removing danger of loosening an end plate on the pin.

It is a further object of this invention to provide a method of disconnecting a rope connection under tension comprising the steps of : providing a connector for rope, comprising: a connector body with a left side and a right side configured to receive a rope wrapped around said connector body, a bale with a right side and a left side and a bottom right side end and a bottom left side end mounted on and detachable from said connector body, a main load pin subassembly extending from the right side to the left side of both the connector body and bale, and a restraining load subassembly extending from the right side to the left side of the connector body; engaging the restraining load subassembly and relieving tension from the bale when restrained thereby allowing removal of the main load pin subassembly and detachment of the bale from the connector body.

BRIEF DESCRIPTION OF THE DRAWINGS

FIG. 3A depicts a preferred embodiment of the connector body in an isometric view.

DETAIL DESCRIPTION OF THE INVENTION

Figure 1:
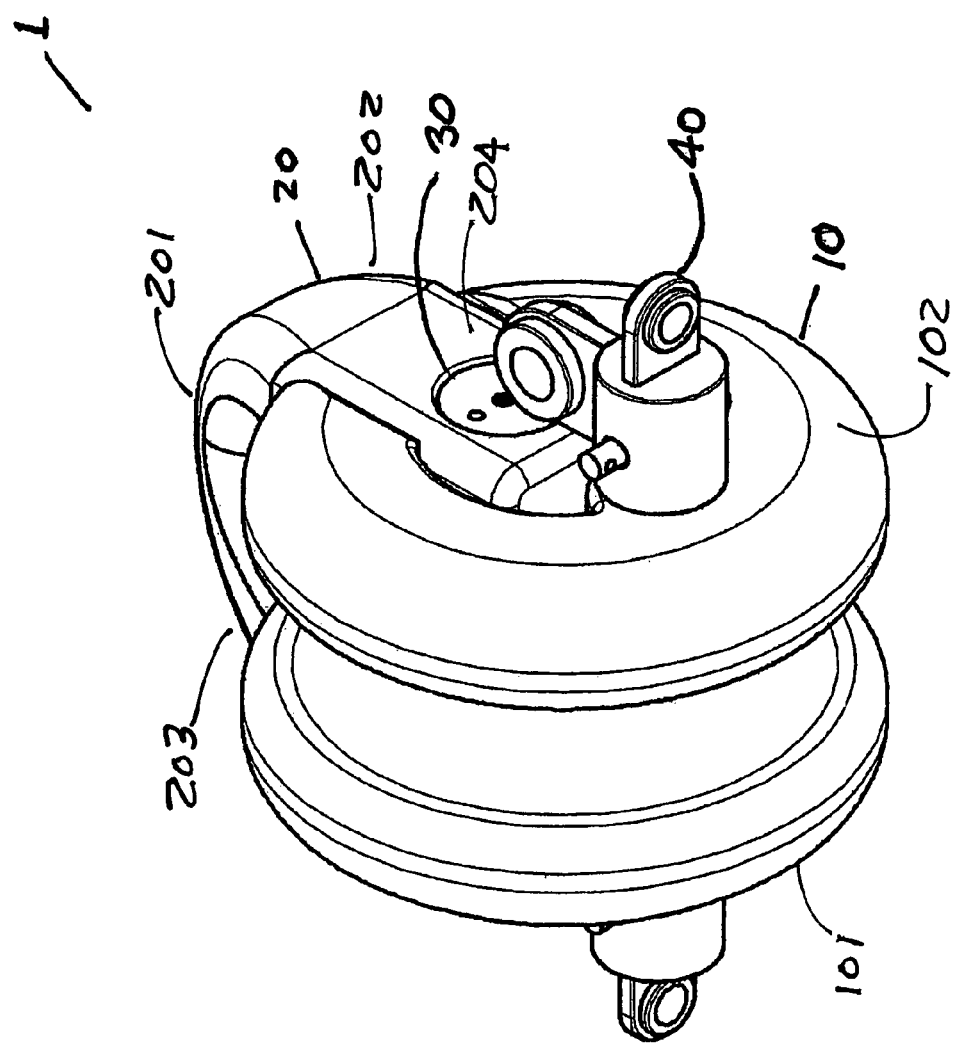
FIG. 1 depicts the inventive detachable synthetic rope connector in an isometric view without the rope being shown and without any attachments to the bale. The major components that extend outside the connector body can be seen in this view.
Figure 1A:
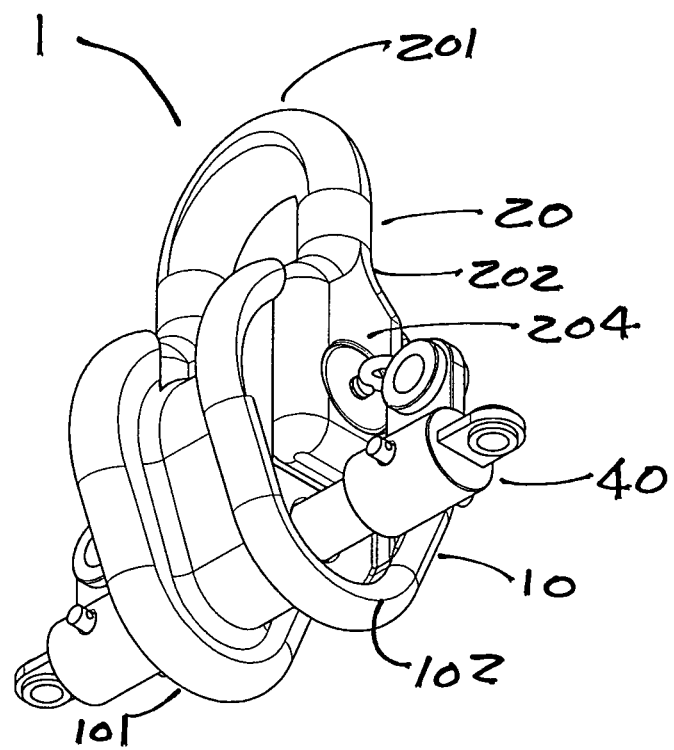
FIG. 1A depicts a preferred embodiment of the inventive detachable synthetic rope connector in an isometric view without the rope being shown and without any attachments to the bale. The major components that extend outside the connector body can be seen in this view

FIG. 1 presents the invention, termed a detachable rope connector 1, consisting of an assembly that includes a connector body 10 with a left side 101 and a right side 102, a bale 20 with an apex 201, a right side 202, a left side 203, a bottom right side end 204 and a bottom left side end 205, a main load pin sub assembly 30 and a restraining load sub assembly 40. FIG. 1A depicts a preferred embodiment of the inventive detachable rope connector.

Figure 2:
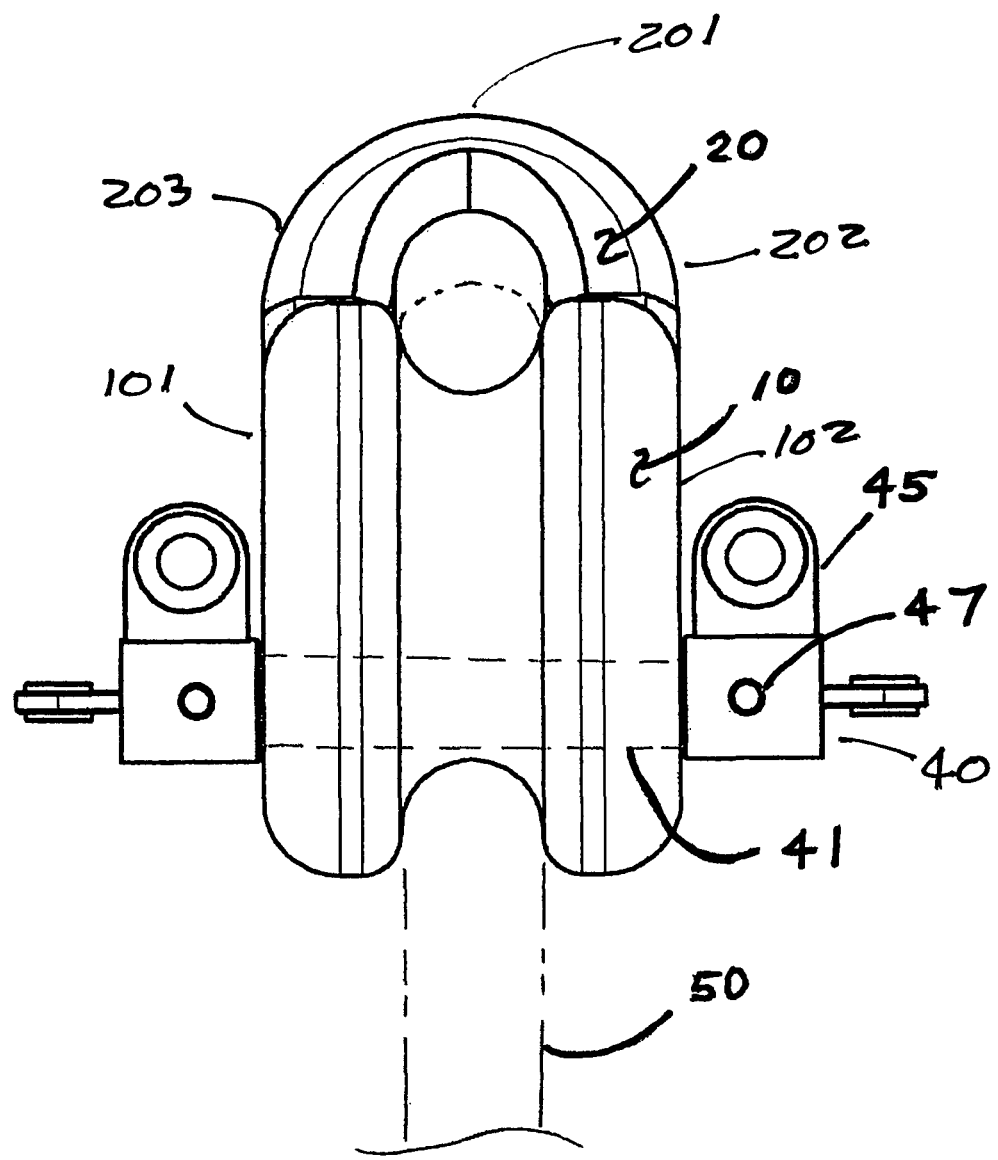
FIG. 2 depicts the inventive detachable synthetic rope connector in a side view.
Figure 2A:
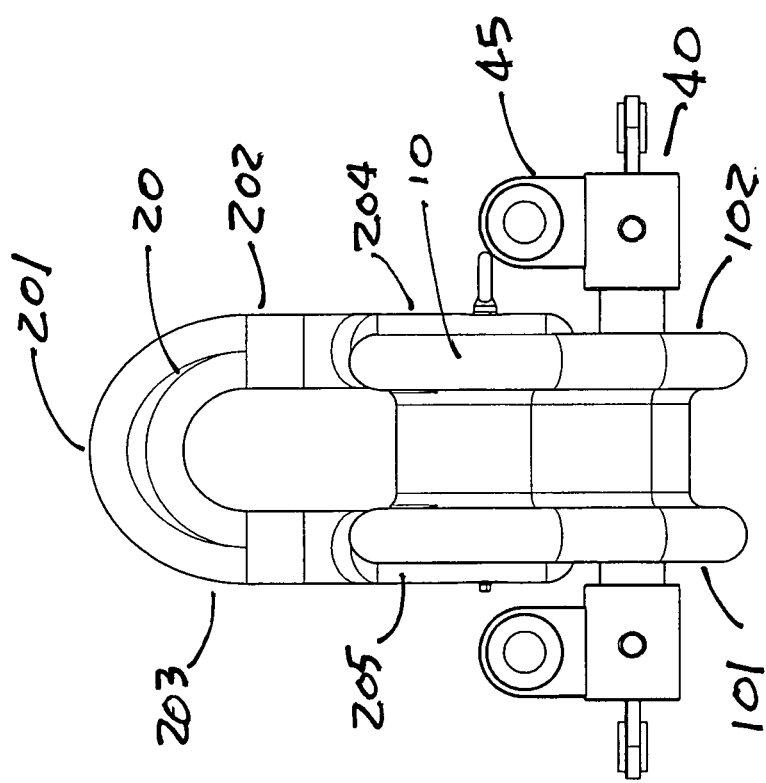
FIG. 2A depicts a preferred embodiment of the inventive detachable synthetic rope connector in a side view.
Figure 3:
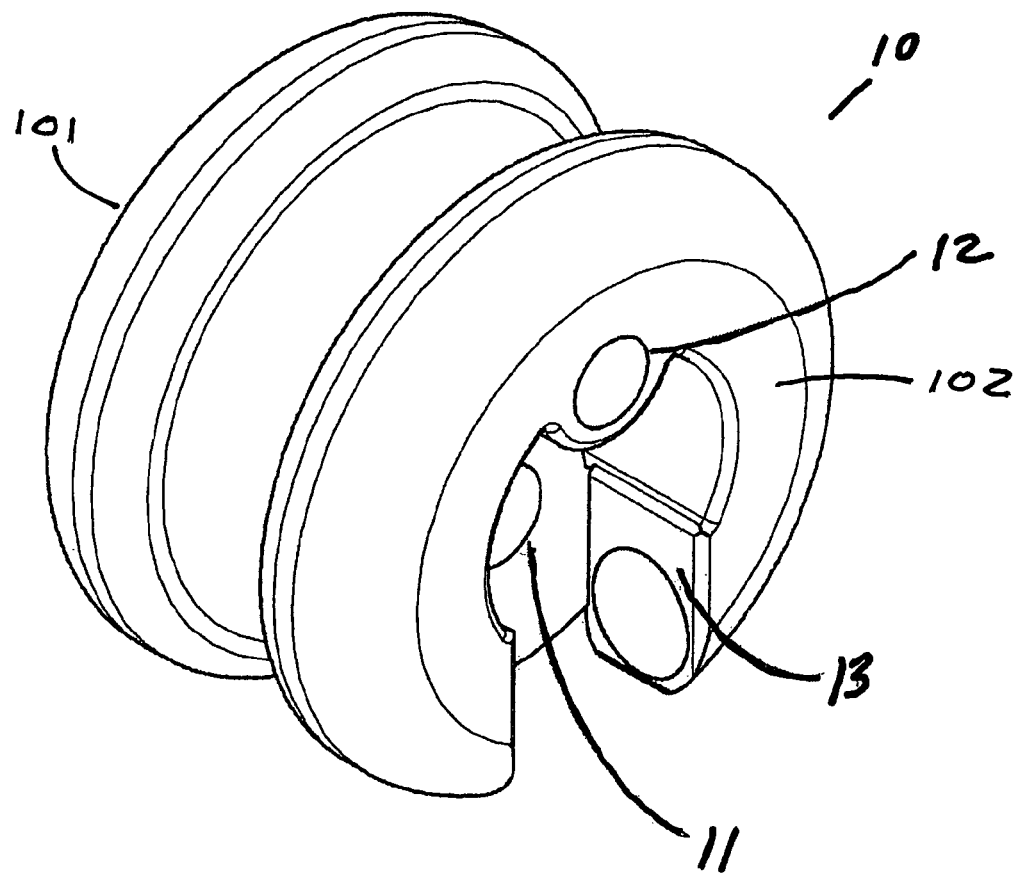
FIG. 3 depicts the connector body in an isometric view.
Figure 34:
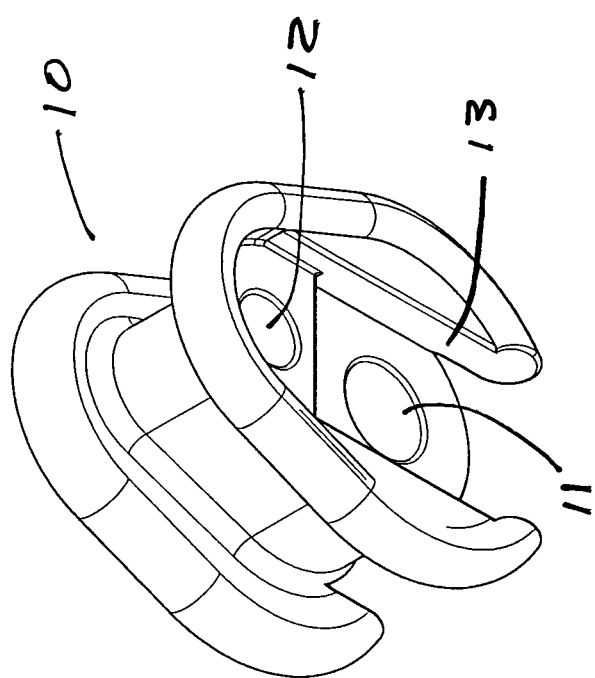

The connector body 10 shown in FIGS. 3 and 3A and separate from the assembly in FIGS. 1, 1A, 2 and 2A, is formed similar to that of a conventional rope thimble from the standpoint that a synthetic rope 50 or rope of other construction, indicated in phantom lines in FIG. 2, can be wrapped around the connector body 10 and secured and thereby transfers a tension load from the rope 50 to the structure of the connector body 10.

As illustrated by the components shown in FIGS. 1, 1A, 2 and 2A, the detachable rope connector 1 transfers loads from the rope 50 through the connector body 10 via the main load pin sub assembly 30 to the bale 20 and consequently to other connectors or chain elements. The bale 20 is removable when the connector body 10 is restrained and the tension can therefore be relieved.

In FIGS. 3, and 3A, the connector body 10 is shown to include a cavity 11 through which the main load pin sub assembly 30 extends. The connector body 10 also includes a second means of connection to the connector body illustrated by a hole 12 by which the restraining load sub assembly 40 connects. The second means to restrain the connector body 10 is shown utilizing a restraining pin 41 with padeye caps 45 secured by pins 47. It is apparent that slotted means of various descriptions can be made in the side or other areas of connector body 10 that can be used to restrain the connector body 10 from moving to allow the bale 20 to be removed even while the rope 50 is under tension.

Figure 4:
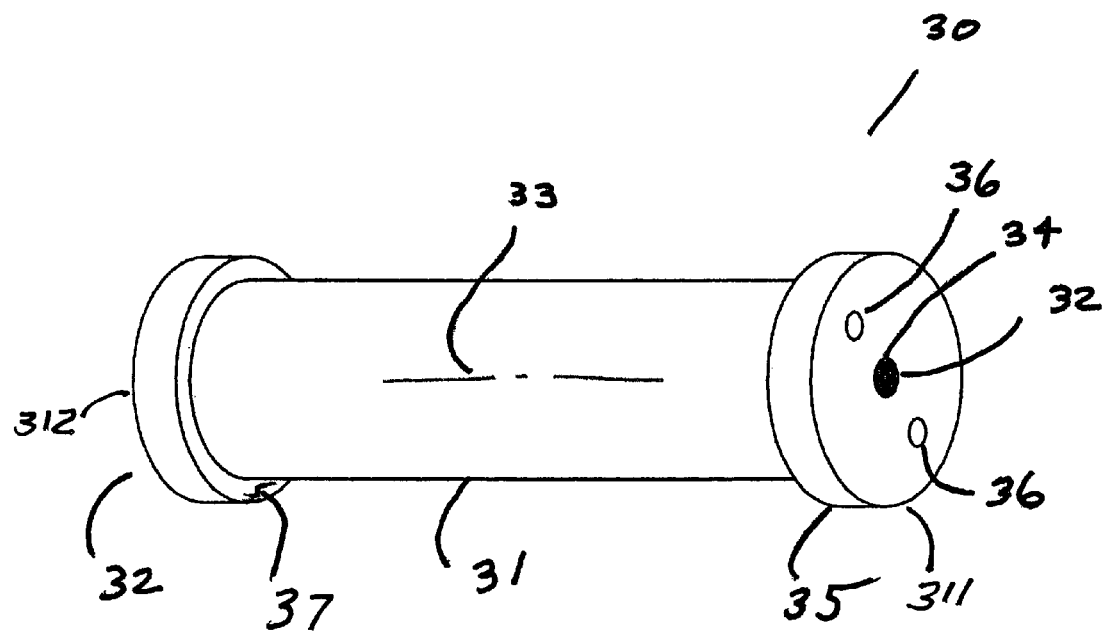
FIG. 4 depicts the main load pin sub assembly in an isometric view.
Figure 6:
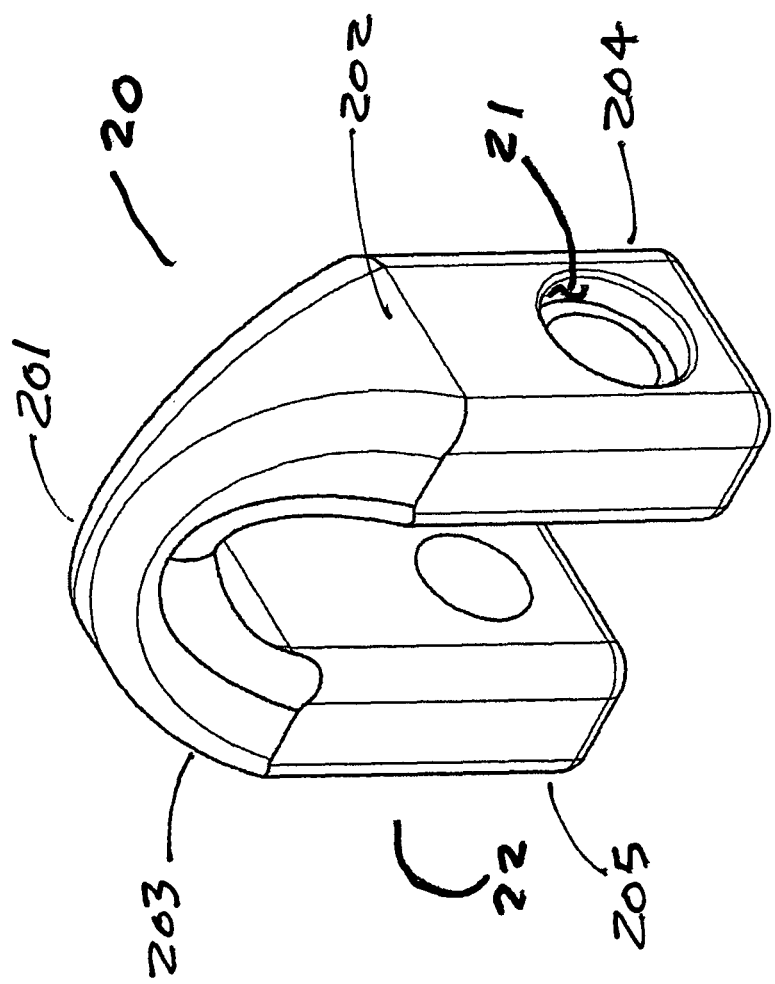
FIG. 6 depicts the bale in an isometric view.
Figure 6A:
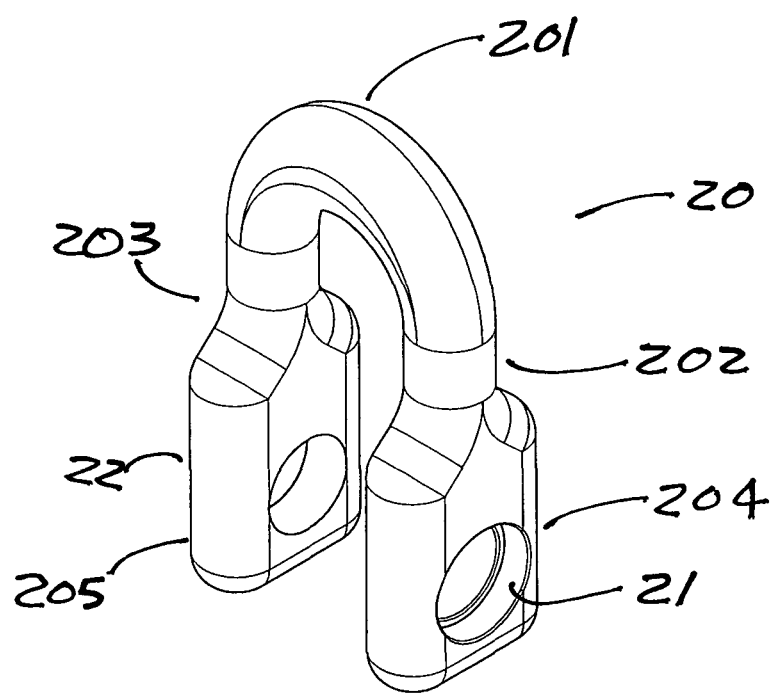
FIG. 6A depicts a preferred embodiment of the bale in an isometric view.

FIG. 4 depicts the main load pin sub assembly 30 with a main load pin 31 with a right end 311 and a left end 312 and a circular nut plate 35 on one of the ends 311 or 312. The main load pin assembly 30 is configured to present a surface free of sharp edges to prevent damage to synthetic rope and to prevent snags. The main load pin 31 is provided with threaded holes 32 at both ends on its centerline 33 to provide for use of screw eyes and other fittings that connect into the threaded holes 32 to lift and assist the positioning and removal of the main load pin 31 from the connector body 10 and bale 20 when connected. The main load pin 31 is configured with a shoulder 37 on the end opposite the circular nut plate 35 that seats within a recess 21 of the bale 20 as shown in FIG. 6. A threaded end 34 is provided opposite the shoulder 37 on the main load pin 31 to which the circular nut plate 35 is attached.

The circular nut plate 35 of the main load pin sub assembly 30, shown in FIG. 4, also seats within a recess 22 of the bale 20. The circular nut plate 35 includes spanner holes 36 that extend through its thickness. The radii of the spanner holes 36 are less than the radius of the body of the main load pin 31. This feature allows the spanner holes to be used to lock the circular nut plate 35 to the main load pin 31 by drilling and tapping at final assembly. By restraining the circular nut plate 35 directly to the main load pin 31, the circular nut plate 35 is prevented from loosening although the main load pin 31 may be allowed to rotate.

Figure 4A:
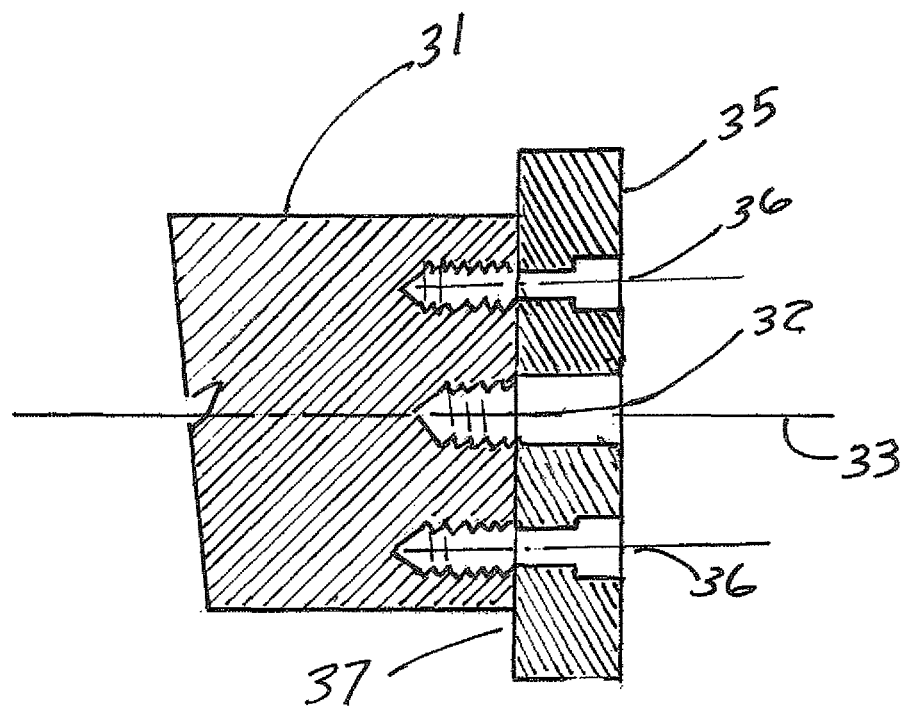
FIG. 4A depicts a cross section of one end of the main load pin subassembly.

In FIG. 4A, a cross section of one end of the main load pin subassembly 30 is shown with a circular nut plate 35 locked on the end of the main load pin 31 through spanner holes 36, and a threaded hole 32 on the centerline 33 of the main load pin 31 and accessible through the circular nut plate 35.

Figure 5:
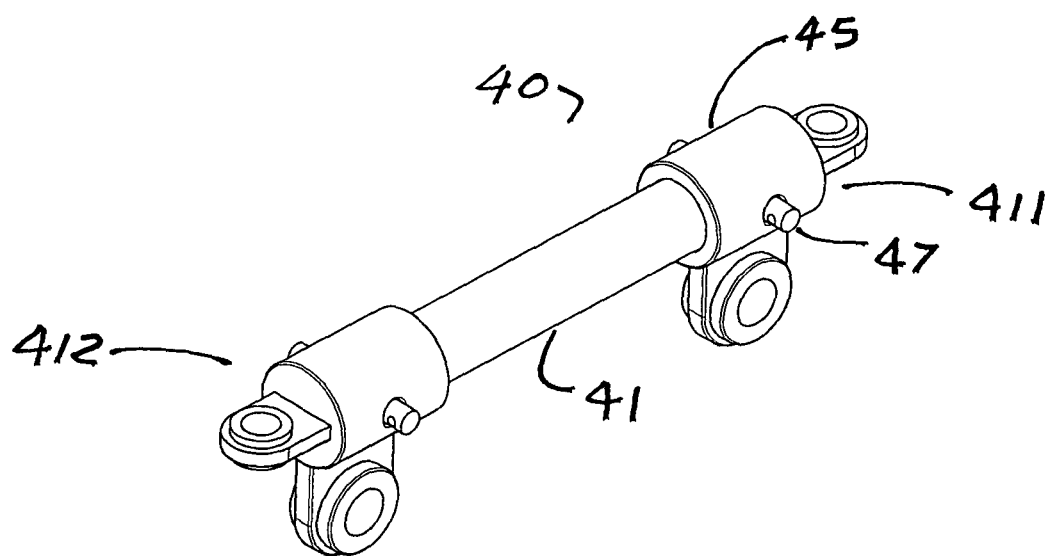
FIG. 5 depicts the restraining load sub assembly in an isometric view.

FIG. 5 depicts the restraining load sub assembly 40 with a main pin 41, with a right end 411 and a left end 412, padeye caps 45 and retainer pins 47. The provision for end mounted connections such as the padeye caps 45 or similar appurtenances to which external cable or other systems can be attached provides restraint for the rope 50 by means of the connector body 10 allowing tension to be transferred from the bale 20 allowing separations and connections to be under slack conditions.

FIG. 6 depicts the bale 20 that is configured to pass through chain when disconnected from the connector body 10. The bale 20 is also configured to connect two bales together where intended or to utilize a master link or similar connecting link for attachments. To prevent unwanted rotation of the bale 20 and the connector body 10, a recess 13 in the connector body 10 is provided to constrain the bale 20. The cross section of the bale is configured to reduce stress intensification factors and to reduce contact stresses when interconnecting two bales or a bale 20 to chain or chain fittings by approximating the required radius of the intended mating components. The bale is further recessed into the connector body. The recess allows for pre-describing the allowable rotational deflection to the degree desired for the application without attempting to utilize keys or cross pins that would be subjected to high shear loading. The recess of the bale further limits the inner gap distance in the bale which reduces the combined stresses in the bale allowing for a reduced cross section that may therefore pass through chain and smaller diameter access holes in existing connecting links. The cross section of the bale is further configured to minimize stresses and weight yet allow connection through smaller connecting link access holes. The cross section of the bale is optimized to the degree that in some instances may require up to 90 degrees rotation during insertion into the mating connecting link. These features are unique and very useful and together reduce handling weight and increase safety in the workplace.

The present invention provides features which allow one end of the connector, the bale 20 or other components to which the tension has been relieved, to be removed while restraining the connector body 10 to which the rope 50 is attached. The connector body 10, in turn, restrains the synthetic or other rope 50 while under tension. This feature is both unique and useful for offshore mooring systems composed of multiple synthetic and other rope sections in deep water.

We claim:

1. A detachable connector for a rope, comprising: a connector body with a left side and a right side configured to receive the rope wrapped around said connector body, a bale with an apex, a right side, a left side, a bottom right side end and a bottom left side end mounted on and detachable from said connector body, a main load pin subassembly extending from the right side to the left side of both the connector body and the bale, and a restraining load subassembly extending from the right side to the left side of the connector body, wherein the bale is recessed into the connector body, the load pin subassembly with connecting plates being recessed into the bale, wherein the bale has a cross section varied along its right side and its left side from its bottom right side end and its bottom left side end to its apex, wherein the connector body further comprises a cavity extending from the right side to the left side of the connector body to receive said main load pin subassembly, a hole extending from the right side to the left side of the connector body to receive said restraining load subassembly, and recesses on the right and left sides of the connector body to respectively receive and constrain the bottom right side end and the bottom left side end of the bale and the bale further comprises a hole extending from the right side of the bale to the left side of the bale to receive the main load pin subassembly, said hole having recesses on the right side of the bale and the left side of the bale and wherein the main load pin subassembly comprises a main load pin with a right end and a left end, each of said ends having threaded holes, a shoulder on one of said ends configured to seat in the right and left side recesses of the bale, a circular end plate on the other of said ends, configured to seat in one of the recesses of the bale.

2. The detachable connector of claim 1 wherein the restraining load subassembly comprises a main restraining pin having a right end and a left end, each of said ends fitted with padeye caps and retaining pins.

\* \* \* \* \*